(12) United States Patent
Clarke

(10) Patent No.: US 11,723,479 B2
(45) Date of Patent: Aug. 15, 2023

(54) INDICATOR DEVICE AND DISPENSING DEVICE COMPRISING AN INDICATOR DEVICE

(71) Applicant: Stephen William Clarke, Clitheroe (GB)

(72) Inventor: Stephen William Clarke, Clitheroe (GB)

(73) Assignee: Stephen William Clarke, Clitheroe (GB)

( * ) Notice: Subject to any disclaimer, the term of this patent is extended or adjusted under 35 U.S.C. 154(b) by 770 days.

(21) Appl. No.: 16/316,322

(22) PCT Filed: Jul. 7, 2017

(86) PCT No.: PCT/GB2017/052006
§ 371 (c)(1),
(2) Date: Jan. 8, 2019

(87) PCT Pub. No.: WO2018/007830
PCT Pub. Date: Jan. 11, 2018

(65) Prior Publication Data
US 2021/0289952 A1 Sep. 23, 2021

(30) Foreign Application Priority Data
Jul. 8, 2016 (GB) ..................... 1611964

(51) Int. Cl.
*A47F 1/08* (2006.01)
*A47F 10/02* (2006.01)
(Continued)

(52) U.S. Cl.
CPC ............. *A47F 1/08* (2013.01); *A47F 10/02* (2013.01); *G06Q 10/087* (2013.01); *G08B 5/24* (2013.01); *H04L 1/08* (2013.01); *A47F 2010/025* (2013.01)

(58) Field of Classification Search
CPC ...... A47F 1/08; A47F 10/02; A47F 2010/025; G06Q 10/087; G08B 5/24; H04L 1/08
See application file for complete search history.

(56) References Cited

U.S. PATENT DOCUMENTS 6,658,322 B1 * 12/2003 Frederick ............... G07F 11/44
700/242
6,963,791 B1 * 11/2005 Frederick ............... G16H 40/20
700/231
(Continued)

FOREIGN PATENT DOCUMENTS

CN 101801242 A 8/2010
DE 102010061207 A1 6/2012
(Continued)

OTHER PUBLICATIONS

European Patent Office—International Search Report of the International Searching Authority for International Application No. PCT/GB2017/052006 dated Oct. 23, 2017, 4 pgs.
(Continued)

*Primary Examiner* — Michael Collins
(74) *Attorney, Agent, or Firm* — Womble Bond Dickinson (US) LLP

(57) ABSTRACT

An indicator device comprises an indicator member (102, 222, 330) moveable between first and second positions, a switch means (152, 252, 352) engageable by the indicator member when the indicator member is in the second position, a signal generating means (160, 260, 360) for generating a data signal, connected to the switch means, a signal transmitting means (158, 258, 358) connected to the signal generating means for wirelessly transmitting the data signal and an electrical power source (162, 262, 362) for supplying electrical power to the signal generating means and the signal transmitting means, wherein the device is configured to generate and transmit a data signal on actuation of the
(Continued)

switch means. The invention also includes a dispensing device comprising such an indicator device.

22 Claims, 8 Drawing Sheets

(51) Int. Cl.
*G06Q 10/08* (2023.01)
*G06Q 10/087* (2023.01)
*G08B 5/24* (2006.01)
*H04L 1/08* (2006.01)

(56) References Cited

U.S. PATENT DOCUMENTS

| | | | | |
|---|---|---|---|---|
| 7,146,246 B2* | 12/2006 | Clarke | ............ | A47F 1/04 |
| | | | | 700/236 |
| 7,694,589 B2* | 4/2010 | Mehus | ............ | G01G 17/04 |
| | | | | 221/6 |
| 7,747,345 B2* | 6/2010 | Ohmura | ............ | G07F 11/62 |
| | | | | 700/242 |
| 7,922,037 B2* | 4/2011 | Ohmura | ............ | G06V 20/66 |
| | | | | 221/3 |
| 8,006,859 B2* | 8/2011 | Clarke | ............ | A47F 1/04 |
| | | | | 220/500 |
| 8,519,848 B2* | 8/2013 | Stern | ............ | G06K 7/10366 |
| | | | | 705/28 |
| 8,749,359 B1* | 6/2014 | Wilson | ............ | A61J 7/0069 |
| | | | | 340/568.1 |
| 10,555,622 B2* | 2/2020 | Clarke | ............ | A47F 1/04 |
| 2004/0108325 A1 | 6/2004 | Shows | | |
| 2007/0150092 A1* | 6/2007 | Ohmura | ............ | G07F 7/1025 |
| | | | | 700/231 |
| 2007/0181513 A1 | 8/2007 | Ward | | |
| 2009/0152291 A1* | 6/2009 | Ohmura | ............ | G07F 17/0092 |
| | | | | 221/197 |
| 2010/0193538 A1* | 8/2010 | Clarke | ............ | A47F 1/04 |
| | | | | 221/6 |
| 2016/0132823 A1 | 5/2016 | Swafford et al. | | |

FOREIGN PATENT DOCUMENTS

| | | |
|---|---|---|
| WO | 02074138 A1 | 9/2002 |
| WO | 2002074138 A1 | 9/2002 |

OTHER PUBLICATIONS

European Patent Office—Written Opinion of the International Searching Authority for International Application No. PCT/GB2017/052006 dated Oct. 23, 2017, 7 pgs.

Combined Search and Examination Report by the United Kingdom Intellectual Property Office for GB Application No. 1710978.6, dated Nov. 13, 2017.

Office Action dated Jul. 28, 2020 for Chinese Patent Application No. 2020072302190790.

* cited by examiner

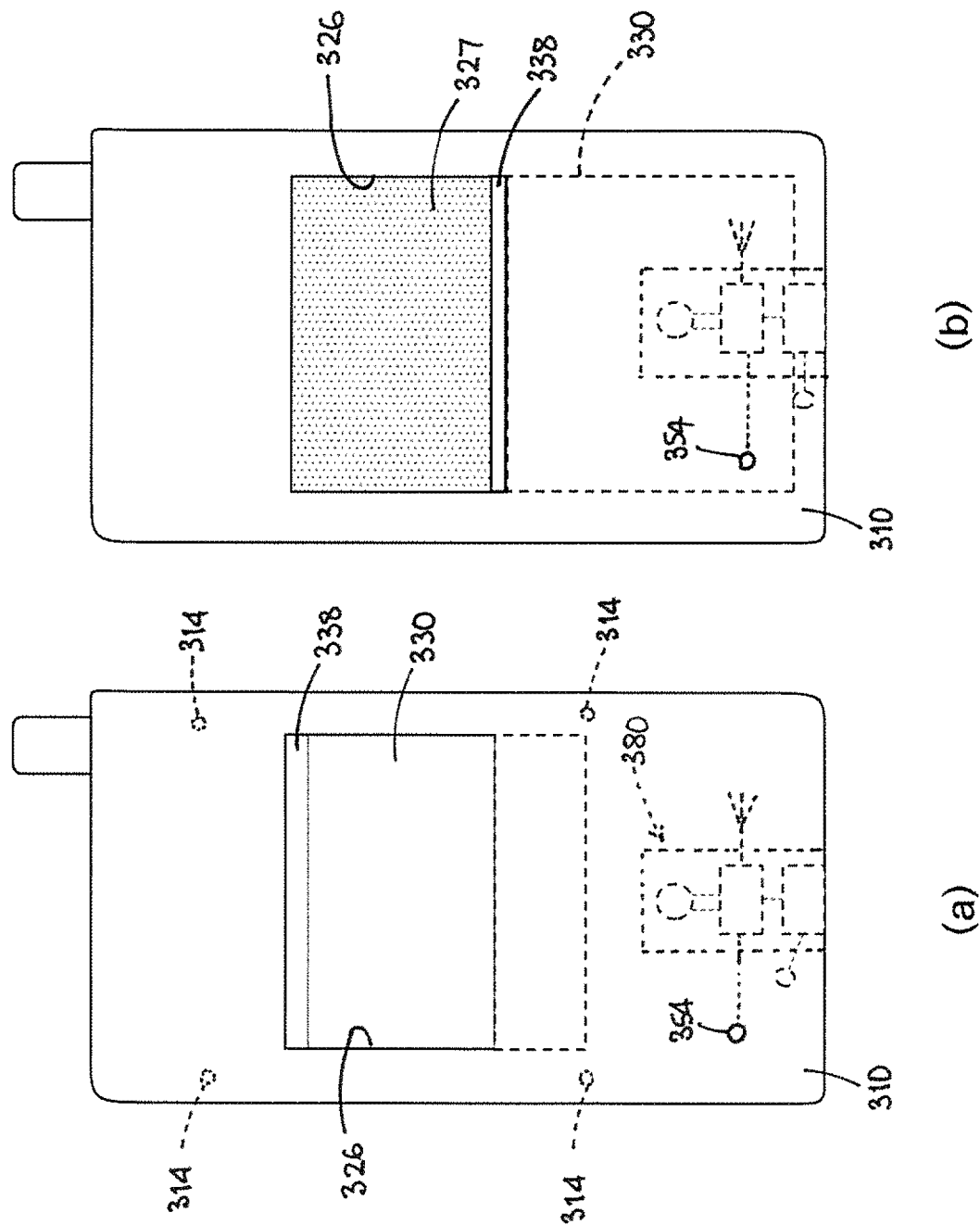

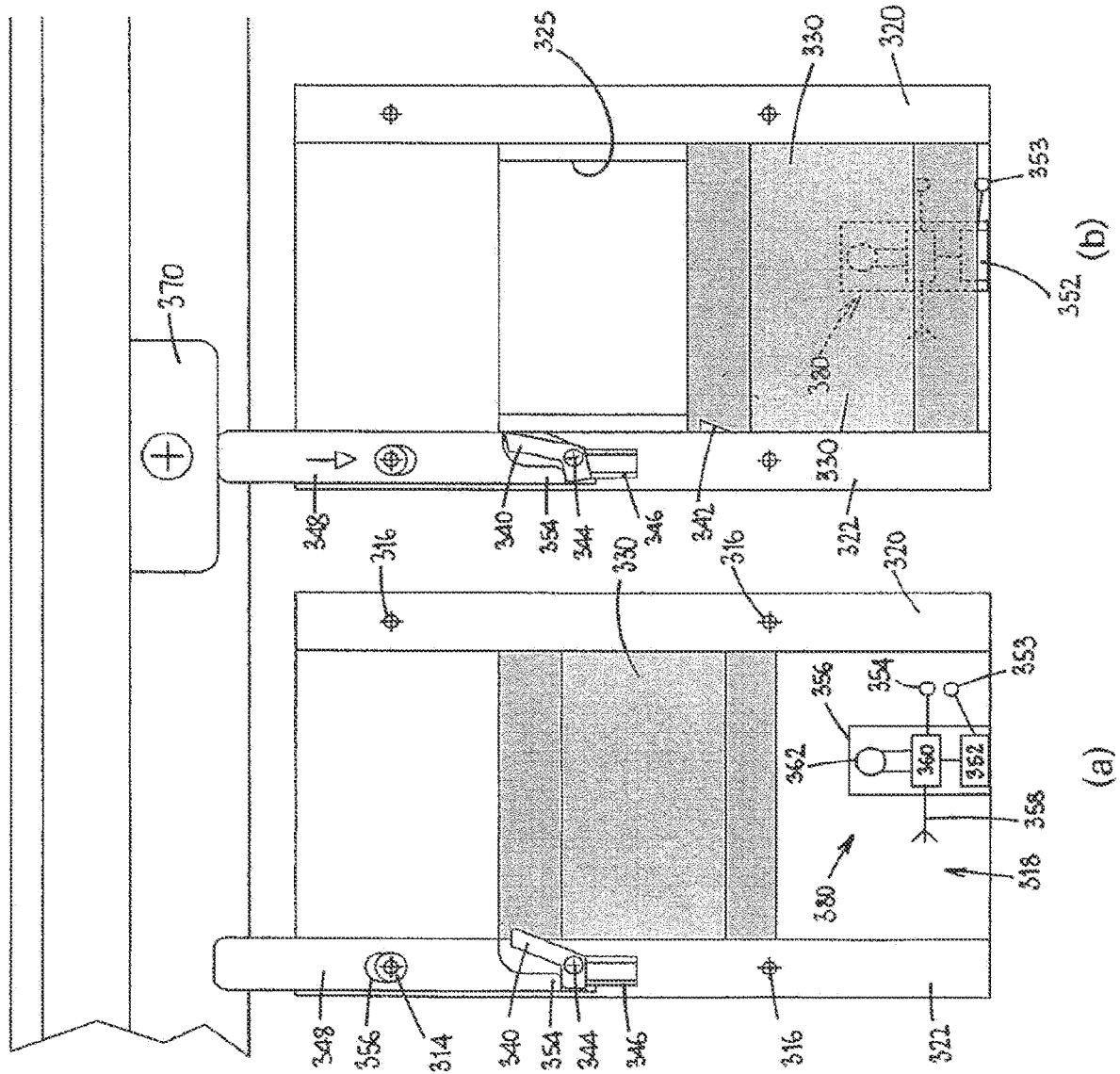

INDICATOR DEVICE AND DISPENSING DEVICE COMPRISING AN INDICATOR DEVICE

CROSS-REFERENCE TO RELATED APPLICATIONS

The present application is a U.S. National Stage of International Patent Application PCT/GB2017/052006 filed Jul. 7, 2017 and claims priority to GB Patent Application No. 1611964.6, filed Jul. 8, 2016. The disclosures of each of the applications noted above are incorporated herein by reference in their entirety.

The present invention relates to indicator devices and to dispensing devices comprising an indicator device and in particular, but not exclusively, to dispensing devices for small items such as components required in workshops, on assembly lines and the like. The present invention also relates to a system which can be used to order components for restocking, when necessary.

One known example of dispenser is shown in WO 2008/155575 A1, which discloses a dispensing device having a loading chamber, a dispensing chamber located beneath the loading chamber and a gate or shutter movable between a first open position and a second closed position to allow selective communication of the loading chamber and the dispensing chamber. A first indicator in the form of a pivotally mounted indicating finger is retainable in a first, retracted position when the gate or shutter is in the closed position and which is displaceable to a second, extended position when the gate or shutter is moved from the closed position to the open position.

Components are removed from the dispensing chamber as required. When the dispensing chamber is empty, the gate or shutter is withdrawn, which allows the components in the loading chamber to fall into the dispensing chamber. Withdrawal of the gate or shutter allows the indicator to move to the extended position, which indicates that the loading chamber is empty and needs to be replenished with stock. The dispenser is labelled with a bar code which identifies the dispenser and the components carried by the dispenser. The bar code can then be scanned, which results in ordering of the components for the dispenser, as part of a stock reordering process.

GB 2435731 A discloses a similar dispenser, which is modified to have an RFID tag which is shielded when the indicator is in the retracted position and unshielded when the indicator is in the extended position. The RFID tag identifies the dispenser and the components carried by the dispenser. An RFID tag reading device (a scanner) is actuated periodically to determine which RFID tags are unshielded and therefore identifies the dispensers which require refilling and the components to be reordered.

The above-mentioned dispensers are typically installed in banks of dispensers, each dispenser carrying its own designated component. Most current systems require manual intervention to reorder stock, for example through periodic visual inspection or periodic scanning of bar codes or RFID tags. However, this is only carried out periodically, with the result that there may be a considerable elapse of time between replacement stock being required and the reordering of that stock taking place. This can result in stock not being available when needed (which may, for example, halt a production process in extreme circumstances) or in the over-ordering of stock to guard against such occurrences.

It is an object of the present invention to provide an indicator device, and a dispenser comprising an indicator device, which overcome or alleviate one or more of the problems associated with known dispensers. It is also an object of the present invention to provide a system for automated management of stock replenishment. Furthermore, it is an additional object of the present invention to provide an indicator device which can be easily integrated into a dispenser.

In accordance with the first aspect of the present invention, there is provided an indicator device comprising: an indicator member moveable between first and second positions; a switch means engageable by the indicator member when the indicator member is in the second position; a signal generating means for generating a data signal, connected to the switch means; a signal transmitting means connected to the signal generating means for wirelessly transmitting the data signal; and an electrical power source for supplying electrical power to the signal generating means and the signal transmitting means; wherein the device is configured to generate and transmit a data signal on actuation of the switch means.

Preferably, the switch means is activated on engagement with, and on disengagement from, the indicator member.

In addition, the indicator device may be further configured to power down after a predetermined time following generation and transmission of a data signal so as to conserve battery life.

In one embodiment, the indicator member is pivotally mounted.

In another embodiment, the indicator member is slidably mounted.

The present invention also includes a dispensing device comprising an indicator device in accordance with the present invention.

In accordance with the second aspect of the present invention there is provided a dispensing device comprising: a loading chamber; a dispensing chamber loaded beneath the loading chamber; a gate or shutter moveable between a first, closed position and a second, open position to allow selective communication of the loading chamber and the dispensing chamber; and an indicator device as described above, wherein the indicator member is retainable in its first position when the gate or shutter is in the closed position and is displaced to its second position when the gate or shutter is moved from the closed position to the open position.

In accordance with the third aspect of the present invention there is provided a system comprising a dispensing device as described above, the system further comprising means for receiving the data signal and means for processing the data signal.

In accordance with the fourth aspect of the present invention there is provided a signalling device comprising: signal generating means for generating a data signal; signal transmitting means for wirelessly transmitting the data signal; an electrical power source for powering the signal generating means and the signal transmitting means; and switch means actuable by movement of an external member, and connected to the signal generating means; the device being configured to generate and wirelessly transmit a data signal upon actuation of the switch means.

The present invention therefore provides a more responsive inventory system. The present invention provides for increased flexibility in installation and can be readily installed in existing dispensers without need to install wires for either power or communication. This has a significant advantage in production environments where loose wires can present a significant hazard. In addition, the use of a wireless system allows for the gradual installation of an inventory system. Items that tend to have significant variations in their requirement for replenishment can also be monitored more effectively, reducing the need to overstock particular items.

Specific embodiments of the invention will now be described, by way of example only, with reference to the accompanying drawings, in which.

FIGS. 7a and 7b are front views of a third embodiment of indicating device in accordance with the present invention, shown in first and second conditions respectively; and FIGS. 8a and 8b are rear views of the indicating device of FIG. 7, with the rear cover removed, corresponding to FIGS. 7a and 7b respectively.

Figure 1:
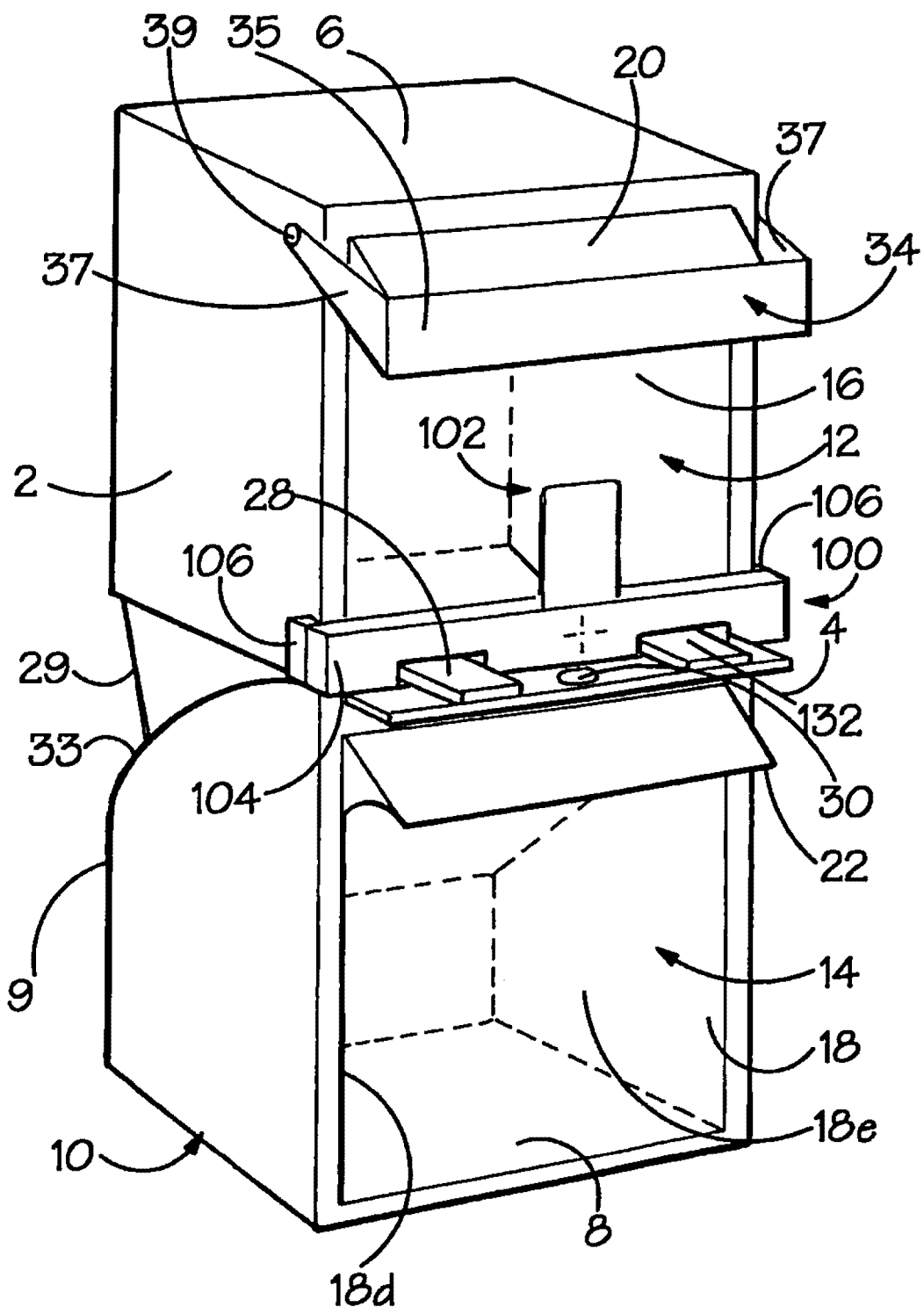
FIG. 1 is a perspective view of a first embodiment of indicating device in accordance with the present invention, fitted to a dispensing device.

The dispensing device shown in FIGS. 1, 2 and 3 is very similar to that disclosed in WO2008/155575. With reference to FIG. 1, FIG. 2 and FIG. 3, the dispensing device comprises a housing 10 in the shape of a rectangular box with two parallel, planar side walls 2, 4 parallel upper and lower walls 6, 8 extending perpendicular to the side walls 1, 4 and a planar rear wall 9 extending perpendicular to the side walls 2, 4 and to the upper and lower walls 6, 8. The rear wall 9 is provided with an inwardly-directed ridge or projection 29 across its width, having inclined upper and lower planar walls 29a, 29b. The projection 29 serves to direct articles during operation of the dispenser, as will become apparent.

The housing is divided into two discrete areas, namely an upper loading chamber 12 and a lower dispensing chamber 14, both of which can be accessed by means of hinged transparent doors 16 and 18 respectively, which are opened by means of a respective handle 20, 22. Both doors 16 and 18 pivot about an axis located towards the base of the doors extending in a direction perpendicular to the side walls 2, 4. A slidable gate 24 is also provided in the device (shown in the closed or engaged position in FIG. 1) which is disposed between the loading chamber 12 and the dispensing chamber 14. The gate 24 is received in two parallel, channels (not shown) extending parallel to the base wall 8 provided on each opposed inner faces of the side walls 2,4 and can thereby slide in and out in a direction 26 parallel to the upper and lower walls 6,8. The gate 24 also forms the base of the loading chamber 12 when closed, and when disengaged permits communication between both chambers. The gate is slid into position by means of a handle 28 formed by a projecting portion of the gate which conveniently has a finger hole 30 disposed therein for a person to place a finger.

An indicating device 100 is also disposed on the front face of the housing, immediately above the gate 24. As will be explained, the indicator device is arranged to display an indicator finger 102 when the gate 24 is opened. The indicator device 100 further comprises a sensor assembly 180 configured to detect display of the indicator finger 102 when the gate 24 is open and to transmit a signal to a server in response as will be described in more detail below.

The dispensing chamber 14 comprises an upwardly open receptacle having a planar front wall 18a, a parallel, shorter rear wall 18b, a planar base wall 18c extending perpendicularly between the front and rear walls and two planar side walls 18d, 18e extending perpendicularly to the front, rear and back walls. The uppermost edges 50 of the side walls of the dispensing chamber 14 are curved convexly and at its front most portion the uppermost edge of one side wall 18d terminates in a locking recess 48, for engagement with a locking pin 42, as will be explained. The front of the dispensing chamber 14 forms the door 18. The loading chamber 12 has a door 16 which permits access to the chamber.

The uppermost front edge of the front face of each of the doors 16, 18, is formed into a downwardly projecting handle 20, 22 extending across the width of the door. The locking chamber of the device is also provided with a locking bar 34 that is used to maintain the closure of the door 16 of the loading chamber 12 until opening is required. The locking bar consists of an elongate member 35 that is attached at either end to parallel arms 37 that are in turn pivotally connected to the side walls 2, 4 by means of a pivot 39. The inner surface (not shown) of the elongate member 35 closely corresponds to the handle 20 of the door 16 such that the locking bar 34 (that may be brightly coloured with words or symbols disposed therein) can clip over the handle 20 and therefore prevent entry to the loading chamber 16 without first un-clipping the locking bar and pivoting the arms 37 to a position such that the locking bar does not impede the movement of the door 16.

Figures 2A, 2B:
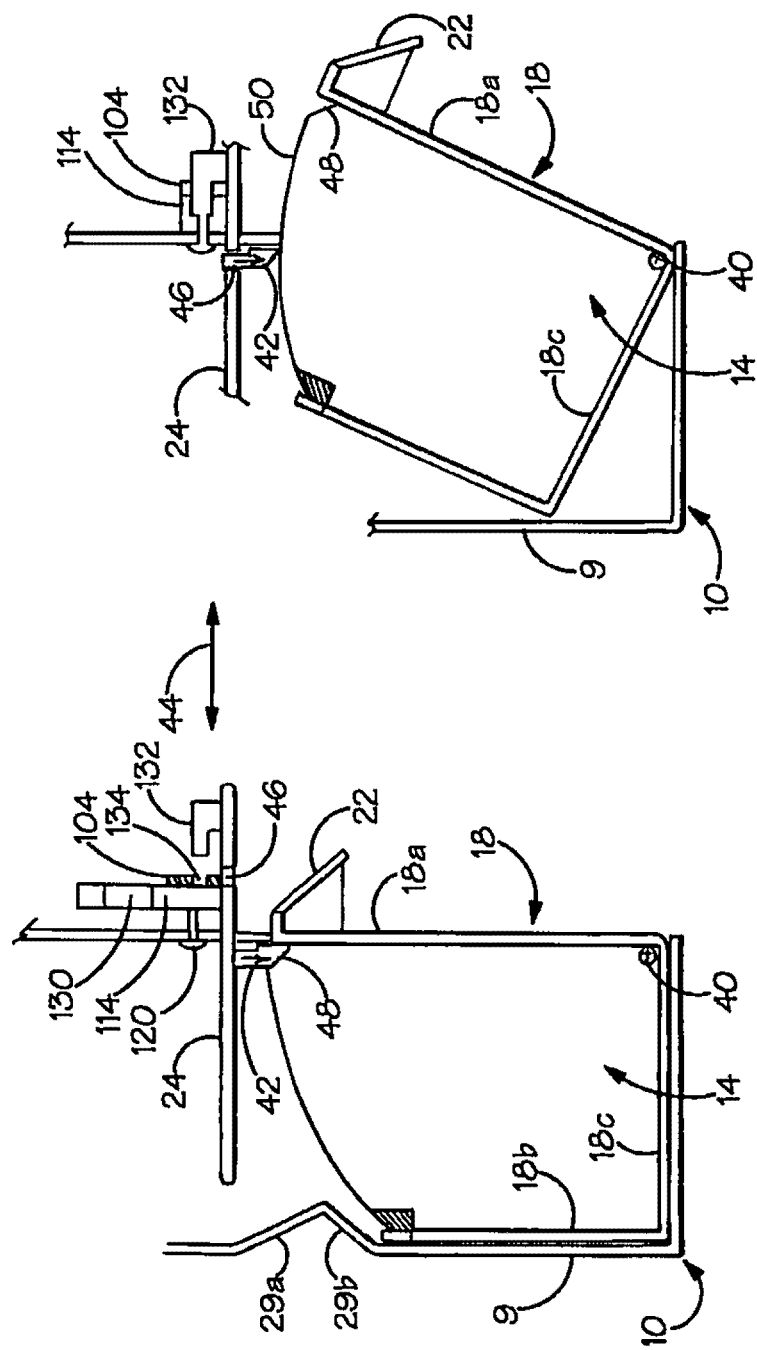
FIGS. 2a and 2b are cross-sectional side views of a lower chamber of the dispensing device of FIG. 1, with the dispensing chamber illustrated in closed and open positions respectively.
Figure 3A:
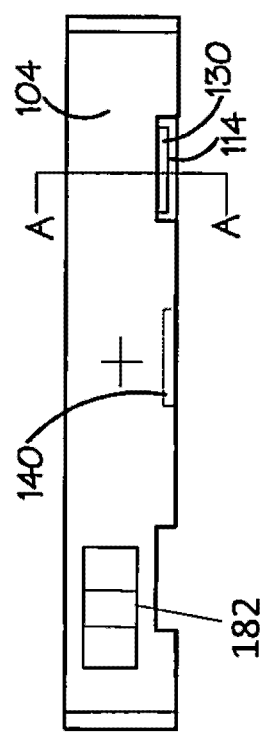
FIGS. 3a and 3b are front views of an indicating means of the device of FIG. 1 shown in a retracted position and an extended indicating respectively.
Figure 3B:
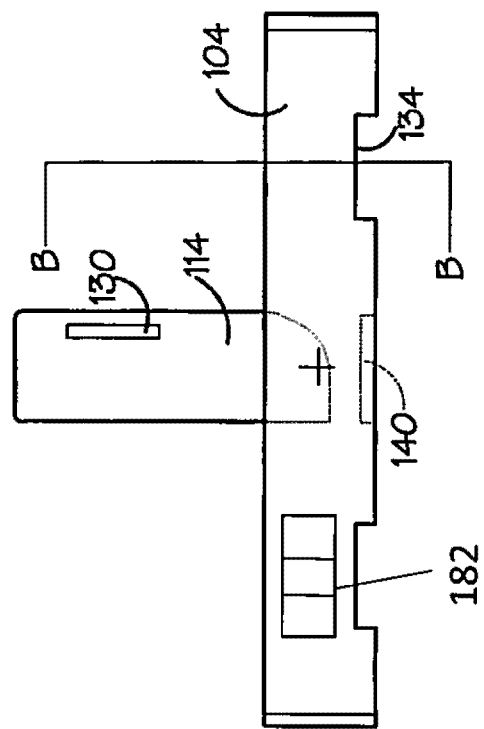

As shown in FIGS. 2a, 2b, 3a and 3b (which include reference numbers that correspond to those of FIG. 1) gate 24 is provided with a hole 46 or depression of non-circular cross-section which slidably receives a locking pin 42 of the same cross-section. The lower end of the locking pin 42 is provided with a horizontally and inwardly projecting lip or foot 52 which contacts the curved upper edge 50 of the side wall 18d. The lower end of the locking pin is complementarily shaped with the notch 48 in the upper edge of the side wall as described previously. The door 18 forms an integral part the receptacle and pivots about a stub axle 40. When the door 18 is in the closed position (FIG. 2a) the pin 42 drops by gravity into the notch 48. The notch 48 has an inclined surface corresponding to the base of the pin 42 and therefore the pin is received in the notch to allow the gate 20 in FIG. 2a to be moved freely in and out in the horizontal plane 44. When the gate 24 is slid outwardly, as shown in FIG. 2a, the hole 46 in the gate is no longer aligned with the pin 42 and as a result the upper end of the pin abuts the undersurface of the gate and is thereby held in engagement with the notch 48. Consequently, the door 18 is prevented from pivoting about the axis 38 by its engagement with the pin 30.

When the gate 24 is in the closed position (as shown in FIG. 2b), the pin 42 is aligned with the orifice 46 in the gate and is free to move through the aperture 48 in the gate 20. As the door 18 is pivoted forwardly, the inclined surfaces of the pin 42 and notch 48 cause the pin to be displaced upwardly, into the orifice 46 thereby both locking the gate in position and enabling the doors to continue to pivot about the axis 40. The lower end of the pin 42 can then slide over the curved inclined upper edge 50 of the side wall 18d of the receptacle to allow the door 18 to open. In this way the gate 24 is prevented from being slid when the door 18 is open.

Figure 4A:
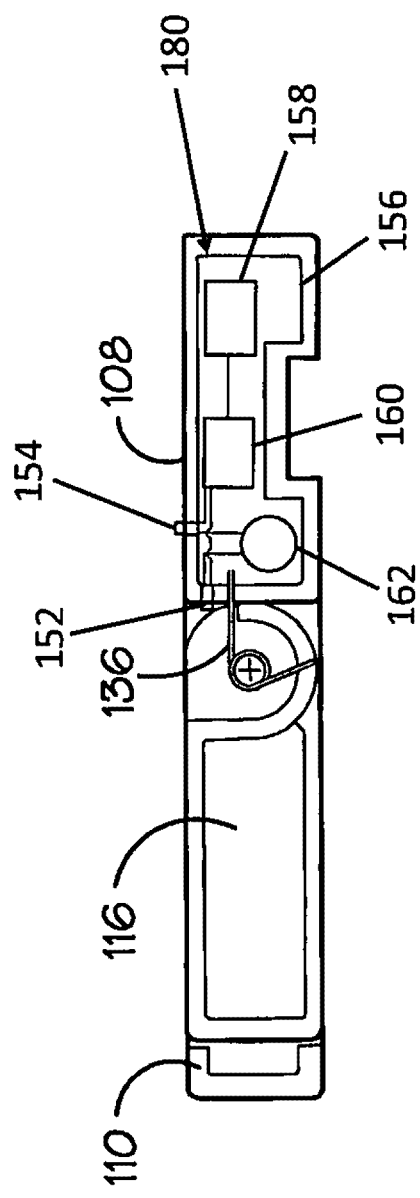
FIGS. 4a and 4b are rear views of the indicating means of the device of FIG. 1, corresponding to the views in FIGS. 3a and 3b respectively.
Figure 4B:
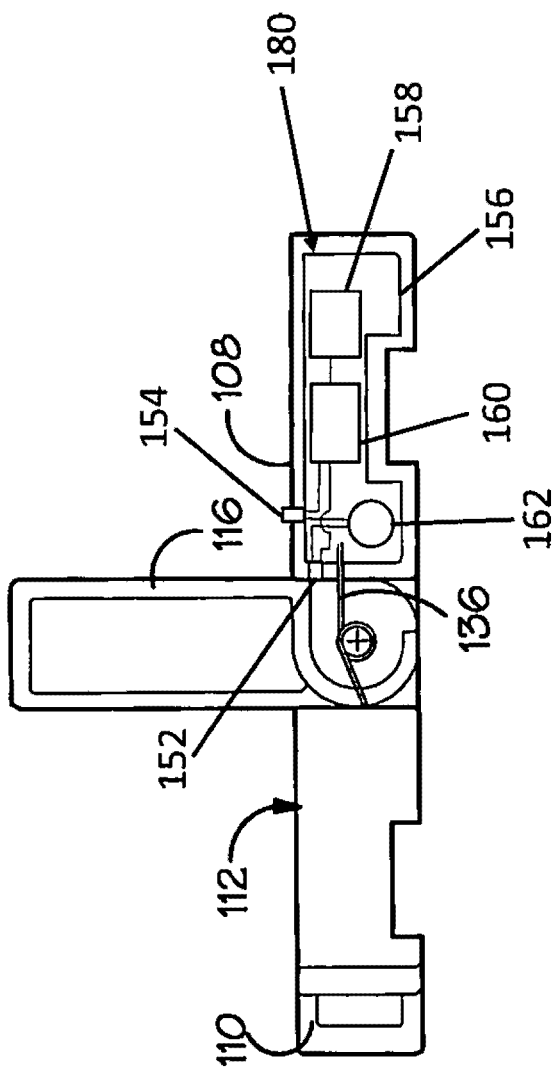

The indicating device 100 comprises an elongate cover plate 104 having an attachment lug 106 located at each end by means of which the cover plate is secured over the front face of the housing at a location immediately above the gate 24. As best seen in FIG. 4, the rear face of the cover plate 104 is provided with upstanding lugs 108, 110 which engage the front face of the housing when the cover plate 104 is installed. The portion of the cover plate between the lugs 108, 110 is thereby spaced from the front face of the housing and defines a recess 112 into which a pivotally mounted indicator finger 102 may be received. The indicating finger 102 is formed from an elongate plastics strip 114 which is generally rectangular in shape, but with a rounded right-hand bottom corner (when viewed from the front) to allow the strip to pivot through a right angle without fouling, as will be explained. The strip 114 is provided with a circular aperture near its base which receives a pivot 120 which is secured in a recess formed in the rear face of the cover plate 104.

The front face of the strip 114 of the indicating finger 102 is also provided with an elongate locking recess 130 towards its right-hand edge (as viewed in FIG. 1), which is adapted to receive the end of a complementarily-shaped locking projection 132 secured to the upper face of the gate 24 when the gate is in the closed position, the cover plate 104 being provided with a recess 134 in its lowermost edge to allow engagement of the locking projection 132 with the locking recess 130 in the strip 114.

The indicating finger 102 is urged by means of a torsion spring 136 connected to the strip 114 and the rear of the cover plate 104 towards one extreme orientation ("the extended position") shown in FIG. 1 in which the indicating finger 102 extends vertically. As shown in FIG. 4, the indicating finger is prevented from pivoting past the vertical position by its abutment with one of the upstanding lugs 108 on the rear of the cover plate 104. The indicating finger 102 may be pivoted manually to the other extreme orientation, at a right angle to the other extreme position ("the retracted position"), against the force of the torsion spring 132 and may be held in that position by closing the gate 24, which causes the end of the projection 132 on the gate 24 to engage with the recess 130 in the front face of the strip 114 of the indicating finger 102.

FIG. 4 best depicts a schematic of an embodiment of the sensor assembly 180. The sensor assembly 180 comprises a printed circuit board (PCB) 156 on which a limit switch 152 is mounted, the limit switch being engageable by the indicating finger 102 when the finger is in its extended position. A programmable electronic controller 160 is mounted on the PCB 156 and is connected to the limit switch 152 and to an antenna 158. The controller is configured to generate a radio signal which is transmitted by the antenna 158 whenever the limit switch 152 is engaged by, or disengaged from the indicating finger 102. The controller is powered by a battery 162. When engaged, or disengaged from, the indicating finger 102 the limit switch 152 is configured to electrically connect the battery 162 to the controller 160 thereby supplying power to the sensor assembly 180. Similarly, after a predetermined period after engagement by, or disengagement from, the finger 102, the limit switch 152 and controller 160 are configured to electrically disconnect the power source 162 from the controller, thereby turning off the power supply to the sensor assembly 180.

The controller 160 has integrated functionality, including but not limited to, power management and communication control. The controller 160 is provided with a unique identifier such as a Media Access Control (MAC) address which is associated with, and therefore identifies, the particular indicator device and dispensing device. In this embodiment, when the limit switch 152 is engaged by the indicating finger 102, power is supplied to the sensor assembly 180 and a first input signal is provided to the controller 160. The controller 160, in response, generates a data signal which is transmitted from the antenna 158. The data includes the MAC address of the controller, identifying the particular indicating device and dispensing device, and may contain additional information such as information relating to the level of stock in the dispenser device. The data may also include information relating to the position of the indicating finger 102 as well as information relating to the remaining power supply level of the battery 162.

The controller 160 is configured to generate a data signal repeatedly for a predetermined period of time (typically five minutes) after actuation of the limit switch 152, after which the controller stops transmitting and enters a dormant mode, in order to preserve battery life.

Figure 5:
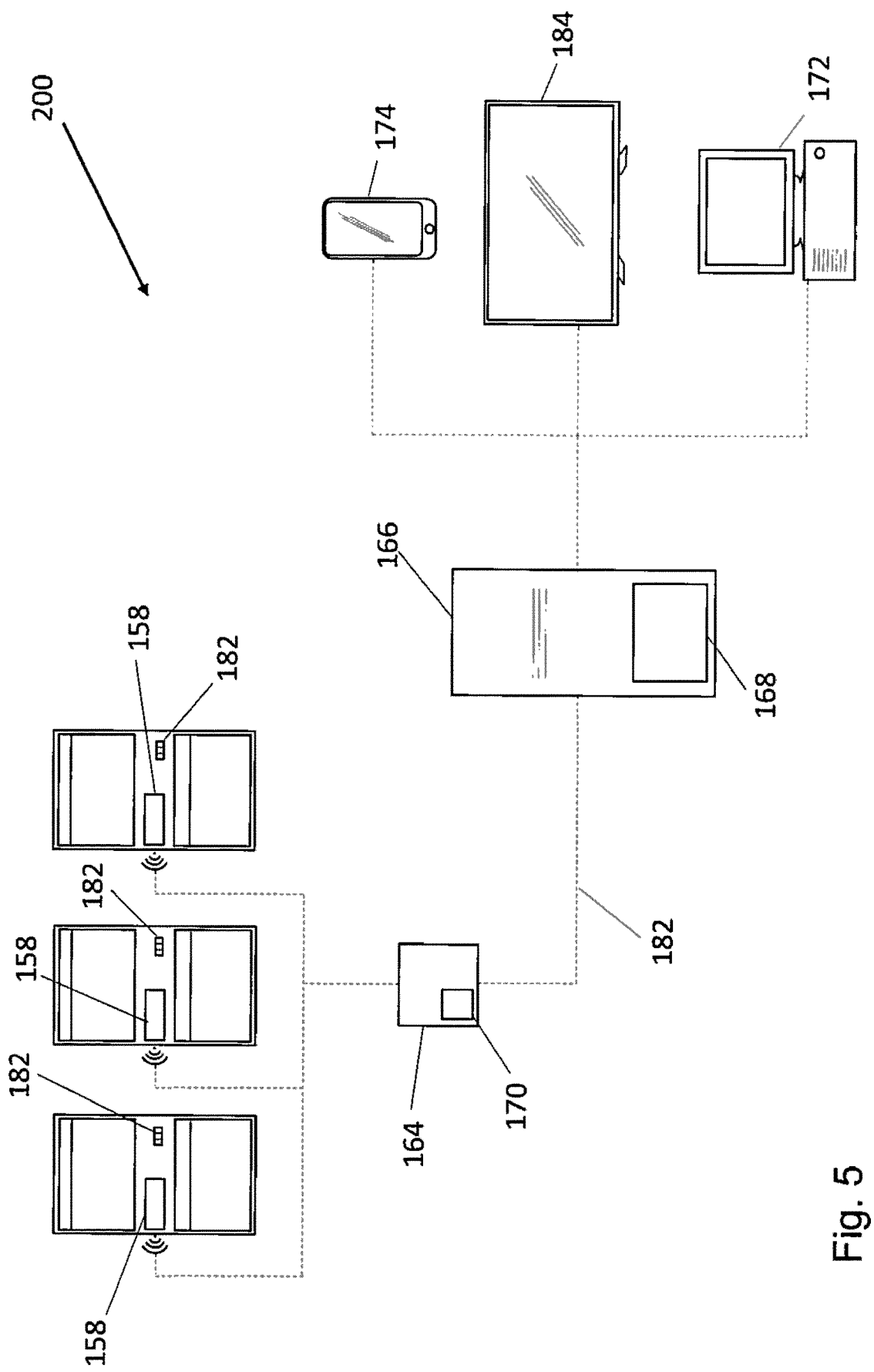
FIG. 5 illustrates a network configured to implement the stock management system in accordance with the present invention.

The power required to transmit wireless signals increases as the transmission distance increases. Therefore, with a battery powered controller 160, the preferred wireless communication configuration will transmit low powered signals over a short distance, typically over a range used by a conventional wireless (Wi-Fi) system. As depicted in FIG. 5, multiple dispensing devices may be joined to one another by a range of methods and structures may be provided on the exterior of the housing may permit the devices to be joined to one another in a modular fashion. The various antennas transmit a wireless signal to a wireless gateway 164, located nearby, and thus a low powered transmission is suitable. The wireless gateway 164 routes packets from the various antennas to a central server 166 where the transmitted information, identifying the particular dispensing device, and, for example, its level of stock, the orientation of the indicating finger 102 and the remaining power supply level, may be stored and accessed remotely. While the wireless gateway 164 is illustrated as being connected to the central server 166 over a wireless wide areas network (WAN) 182, other network communication methods are also envisaged. The period of data transmission is typically in the order of 5 minutes, and therefore, it is unlikely that signals from different controllers will be sent at the same time. However, the wireless gateway 164 is provided with memory 170 for storing and ordering each data transmission for routing to the central server 166.

Each controller may be configured to provide real time information on the status of its associated dispensing device so that more accurate decisions regarding the need to order additional product can be made, thereby providing a more responsive inventory system.

In use, articles of the same or similar goods are placed in both the loading chamber 12 and the dispensing chamber 14 in preparation for dispensing. The bar 34 is clipped over the upper handle 20 to prevent the inadvertent opening of the door 16. The articles held within the lower dispensing chamber 14 are removed by opening the dispensing chamber door 18. In this condition, the gate 24 is pushed in to the housing to its maximum extent. This prevents the contents of the upper loading chamber 12 from moving into the lower dispensing chamber. It also causes the locking projection 132 on the upper face of the gate 24 to engage with the locking recess 130 in the front face of the strip 114 of the indicating finger 102. This holds the indicating finger 102 in the retracted position and consequently, the limit switch 152 is not activated so that the sensor assembly 180 is powered off. The indicating finger 102, when in the retracted position, also serves to indicate to a nearby observer that the gate has not been opened, i.e. that the upper loading chamber 12 still contains products yet to be transferred to the lower dispensing chamber 14.

When the lower, dispensing chamber 14 is empty and requires refilling, the dispensing chamber door 18 is closed, which causes the locking pin 42 to drop into the notch 48. This allows the gate 24 to be slid outwards and at the same time engagement of the pin 42 in the notch 48 prevents the door 18 from being opened while the gate is open. Opening the gate 24 causes articles in the loading chamber 14 to drop into the dispensing chamber 14.

Opening the gate 24 also withdraws the locking projection 132 on the gate from the locking recess 130 in the front face of the strip 114 of the indicating finger 102. The indicating finger 102 is no longer held in its retracted position and so it is urged by the torsion spring 136 into the extended position as illustrated in FIG. 1. This urges the indicating finger 102 against the limit switch 152, thereby supplying power to the sensor assembly 180. As described above, the controller 160 is configured to transmit information (via the antenna 158) identifying, among other things, the indicator device and the dispenser and the fact that the indicator finger 102 is in its extended position and that therefore the gate 24 has been opened and the upper, loading chamber 12 is empty and requires refilling. When in the extended position, the indicating finger 102 also serves to indicate to a nearby observer that the loading chamber 12 is empty and requires refilling.

The strip 114 may conveniently be of a bright colour, e.g. red, so that it can be easily seen. The gate 24 can then be slid shut, which causes the locking pin 42 to drop into the notch 48 but since the pin is aligned with the article 46 in the gate, the pin can be displaced upwardly into the orifice to allow the door 18 to be opened. This has no effect on the indicating finger 102, which remains in the vertical, extended position. The loading chamber door 16 is further locked by the bar 34 which may have words disposed thereon to the effect that it may only be opened by authorised personnel etc. In its closed position, the pin 42 permits the gate 20 to move about the plane 26,44 and releasably locks the door 18 so that articles held in the loading chamber 12 can drop into the dispensing chamber 14 without becoming lodged in the space 49 formed by the receptacle which is attached to the lower door 18. The bar 34 can be unlocked to replenish stocks in the loading chamber as and when required. Therefore, articles from the loading chamber cannot fall into the space 49 formed when the door 18 is opened (as shown in FIG. 2b).

Once the signal has been transmitted from the sensor assembly 180 and routed through the wireless gateway 164 to the server 166, the server 166 is updated to reflect the new information associated with the identified dispenser device. In response to receiving the information, the server 166 may be configured to prompt a person responsible for re-ordering stock via a display means such as a screen 184 or via any other means including, but not limited to, e-mail 172 or text message 174. The server 166 may be further configured to automatically re-order stock on receipt of the transmitted signal such that the ordering of stock can be automated or semi-automated.

If the replacement product is immediately available, the indicating finger 102 can be pivoted back down to its retracted position and can be locked in its retracted position by engaging the locking projection 132 with the locking recess 130 on the strip 114 of the indicator finger 102. If the gate 24 is fully pushed in, it may be necessary to withdraw it slightly to allow the finger 102 to be pivoted to its retracted position and then pushed in again to engage the projection 132 in the recess 130. The upper chamber is then refilled by unfastening the locking bar 34, opening the door 16 of the upper chamber and replacing the contents. The door 16 is then re-closed and the locking bar 34 is refastened. Pivoting of the indicating finger 102 back down to its retracted position disengages the finger from the limit switch 152 thereby once again connecting the power source to the controller 160, turning on the power supply to the controller 160 of the sensor assembly 180. Disengagement of the indicating finger 102 from the limit switch 152 causes the battery 162 to power up the controller 160, which in turn generates a signal identifying the indicator device and dispensing device and confirming the retracted condition of the finger (and, by extension, that the upper chamber has been replenished). This signal is transmitted as described above to the server 166, which is then updated to reflect the replenished status of the dispenser.

The indicator device is also provided with a separate, second switch 154, which can be depressed manually. The switch 154 is positioned on the top face 148 of the lug 108 and is connected to the battery 162 and the controller 160 and they are configured such that when the switch 154 is depressed, power is supplied to the controller, which is configured to generate a second data signal which is transmitted via the antenna 158. The data includes information identifying the particular indicator device and dispensing device along with further information indicating that the stock is required immediately. The data is transmitted by the antenna 158 to the wireless gateway 164 where it is then routed to the central server 166. Once the data has been received, the central server 166 is updated to show that the dispenser requires replenishing as a matter of urgency.

Figure 6:
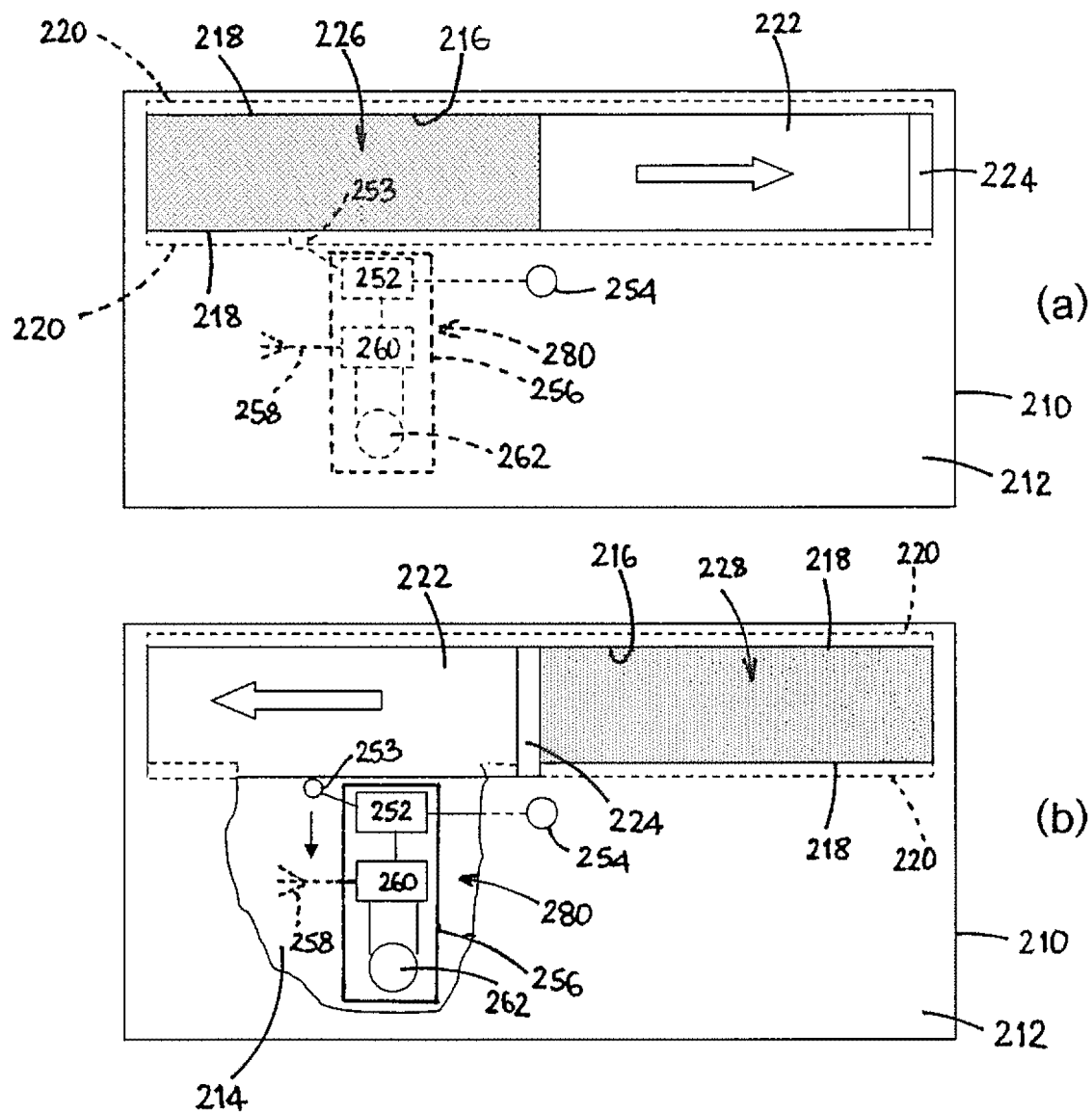
FIGS. 6a and 6b are front views of a second embodiment of indicating device in accordance with the present invention, shown in first and second conditions respectively, with FIG. 6b being shown partly cut away.

The second embodiment of indicator device in accordance with the present invention is shown in FIG. 6 and is very similar to that shown in GB 2487927 A. The indicator device comprises a rectangular, planar body 210 formed from a front plastics rectangular sheet 212 which is secured by radio-frequency welding to a rear plastics rectangular sheet 214. An elongate rectangular slot 216 is provided in the front sheet 212 of the body 210, adjacent to the upper edge of the front sheet, and extending parallel to the upper edge. The longitudinally extending edges 218 of the slot 216 are provided with an undercut, indicated at 220, by means of which a rectangular, plastic slide member 222 is slidably mounted in, and retained in, the slot 216. The slide member 222 is of the same thickness as the upper sheet 212, so that its outer face is level with the outer face of the upper sheet 212, except for a projecting finger tab 224 at its right-hand end, to facilitate manual sliding of the slide member 222.

The slide member 222 is slidable between a first extreme position shown in FIG. 6a, in which its right-hand and abuts the right-hand end of the slot 216, and a second extreme position shown in FIG. 6b, in which its left-hand end abuts the left-hand end of the slot 216. The slide member 222 is half the length of the slot 216. When the slide member 222 is moved to the first extreme position (FIG. 6a), a first status indicating area 226 is revealed and similarly in the second extreme position (FIG. 6b) a second status indicating area 228 is revealed. For example, the first and second status indicating areas 226, 228 may be coloured green and red respectively or may comprise wording, symbols or other means of identifying a status.

It will also be observed that the indicator device is provided with a sensor assembly 280 located between the inner faces of the front and rear plastics rectangular sheets 12, 14. The sensor assembly 280 comprises a printed circuit board (PCB) 256 on which a limit switch 252, a programmable electronic controller 260, an antenna 258 and a battery 262 are mounted. As shown in the figures, the limit switch 252 is mounted adjacent to the lower elongate edge of the slot 216. The limit switch 252 is configured so that when the plastic slide member 222 is in the first extreme position illustrated in FIG. 6a, the actuating member 253 of the limit switch 252 is level with the lower elongate edge of the slot. However, as the slide member 222 is moved to the second extreme position illustrated in FIG. 6b, it engages the actuating member 253 of the limit switch 252. The electronic controller 260 is configured so that when the limit switch 252 is displaced, by engagement with or disengagement from the slide member 222, a radio signal is generated which is transmitted by the antenna 258. As in the first embodiment, when the limit switch 252 is engaged by, or disengaged from, the slide member 222, it is configured to electrically connect the battery 262 to the controller 260, thereby supplying power to the sensor assembly 280. Similarly, after a predetermined period after engagement by, or disengagement from, the slide member 222, the limit switch 252 and controller 260 are configured to electrically disconnect the battery 262 from the controller, thereby turning off the power supply to the sensor assembly 280.

The sensor assembly 280 is thereby configured to send a signal which is indicative of the position of the slide member 222. As for the first embodiment, the controller 260 has integrated functionality including, but not limited to, power management and communication control. The controller 260 is provided with a unique identifier such as a Media Access Control (MAC) address which is associated with, and therefore identifies, the particular indicator device. The data signal generated by the controller 260 and which is transmitted from the antenna 268 includes the MAC address of the controller, identifying the particular indicator device, and may contain additional information such as information relating to the remaining power supply level of the battery 262.

The controller 260 is configured to generate a data signal repeatedly for a predetermined period of time (typically five minutes) after actuation of the limit switch 252, after which the controller stops transmitting and enters a dormant mode, in order to preserve battery life.

In use, the indicator device is typically secured to the front face of a dispenser such as that shown in FIG. 1, by means of a mounting bracket (not shown) or other securing means. If the dispenser does not require refilling (i.e. the upper chamber 12 is still full), the slide member 222 of the indicating device is slid to its first extreme position, as shown in FIG. 6a. This causes the first status indicating area 226 (e.g. coloured green) to be displayed, indicating that the dispenser does not require refilling.

When it becomes necessary to refill the upper chamber 12 of the dispenser, the slide member 222 is slid manually to its second extreme position, as shown in FIG. 6b. This causes the second status indicating area 228 (e.g. coloured red) to be displayed, thereby providing a visual alert that the dispenser requires refilling.

In addition, as the slide member 222 is moved to the left-hand end of the slot 216, it engages the actuating member 253 of the limit switch 252. As explained previously, this results in the generation of a signal by the controller 260, which is transmitted by the antenna 258, indicative of the status of the indicator device and, by extension, that the dispenser to which the indicator device is attached requires refilling.

When the dispensing device is refilled with stock, the slide member 222 is slid to the opposite end of the slot 216 as shown in FIG. 6a. Disengagement of the slide member 222 from the limit switch 252 again generates a signal for a predetermined period of time, indicative of the new position of the slide member 222 and, by extension, that the dispenser has been refilled.

Typically, multiple dispensing devices, each fitted with an indicating device of the present invention, may be joined to one another in a network in a similar manner to that shown in FIG. 5.

As for the previous embodiment, the indicator device is also provided with a separate, second switch 254, which can be depressed manually. The switch 254 is positioned on the front face of the dispenser and is connected to the battery 262 and controller 260 and are configured such that when the switch 254 is depressed, power is supplied to the controller, which is configured to generate a second data signal which is transmitted via the antenna 258. The data includes information identifying the particular indicator device (and by extension dispensing device) along with further information indicating that the stock is required immediately.

A third embodiment of the present invention is shown in FIGS. 7 and 8 and is very similar to that shown in WO 2013/068757 A1. The indicator device comprises a base having a planar, rectangular, plastics rear cover 312 which is removably attached to the body 310 by means of four countersunk retaining screws 314 passing through apertures in the rear face of the rear cover 312 and being screw-threadedly received in corresponding recesses 316 in the body 310. A first, longitudinal extending, flat-bottomed rectangular recess 318 is formed in the rear face of the body between a first, continuous post member 320 on one side of the recess and a second post member on the opposite side of the recess 318.

Rectangular aperture 325, slightly narrower than the longitudinal recess 318, is formed in the base of the recess 318 and forms a window 326 in the front face of the base 310. The portion of the inner face of the rear cover 312 corresponding to the aperture 324 is coloured as a red rectangle 327 of slightly greater than dimensions than those of the aperture 326, as will be explained.

The recess 318 also receives a generally rectangular planar plastics slide member 330 which is of the same width and depth as the recess 318. The uppermost edge of the front face of the slide member 330 is provided with a transversely extending elongate finger tab 338 of the same width as the window and which project through the window 326. The finger tab 338 projects forwardly out of the window 326. In the embodiment illustrated, the slide member 330 is coloured green, as will be explained.

The slide member 330 is slidable between a lowermost position shown in FIGS. 7b and 8b in which the finger tab 338 abuts the lower edge of the window 326 and in which the red indicating rectangle 327 is fully exposed through the window, and an uppermost position shown in FIGS. 8a and 9a in which the finger tab 338 abuts the upper edge of the window 326 and in which position the red indicating rectangle 327 is completely concealed.

The slide member 330 is retained in its uppermost position by means of a spring-loaded pawl or catch 340 which engages with a complementarily-shaped recess 342 in the adjacent edge of the slide member 330. The pawl or catch 340 is pivotally mounted about a pivot pin 344 and is biased towards engagement with the slide member 330 by means of a compression spring 346. The pawl or catch 340 can be pivoted in the opposite direction, out of engagement with the slide member 330, by means of a trigger member 348. The trigger member 348 is flat and generally rectangular and is slidably disposed in a channel formed between the inner face of the rear cover 312 and the inner face of the base. The other end of the trigger member 348 projects out of the upper end of the indicating device and its lower end is provided with a projecting nose portion 354 which engages the pawl or catch 340. The downward movement of the trigger thereby causes the pawl or catch 340 to pivot against the force of the spring 346 and out of engagement with the recess 342 in the adjacent edge of the slide member 330. The trigger 348 is also provided with a slot 356, through which one of the retaining screws 314 passes, slot 356 being elongated to allow such movement.

As the slide member 330 is moved to its uppermost position the pawl or catch 340 engages with the recess 342 in the adjacent edge of the slide member and retains the slide member 330 in its uppermost position. If the trigger is displaced downwardly, the pawl or catch 340 is disengaged from the slide member 330, which then slides downwardly under its own weight to its lowermost position.

It will also be observed that the indicator device is provided with a sensor assembly 380 located between the inner faces of the base and the rear cover 312. The sensor assembly 380 is extremely similar to that of the sensor assembly 280 of the previous embodiment corresponding features are identified by the same reference numerals, with the first digit "2" being replaced by "3". The sensor assembly 380 therefore comprises a printed circuit board (PCB) 356 on which a limit switch 352, a programmable electronic controller 360, an antenna 358 and a battery 362 are mounted. As shown in the figures, the limit switch 352 is mounted adjacent to the lower edge of the body 310 and is configured so that when the slide member 330 is in its uppermost position illustrated in FIG. 7a, the actuating member 353 of the limit switch 352 is not engaged with the slide member 330. However, when the slide member 330 is moved to its lowermost position illustrated in FIG. 7b, it engages the actuating member 353 of the limit switch 352. As for the previous embodiment, the electronic controller 360 is configured so that when the limit switch 352 is displaced, by engagement with or disengagement from, the slide member 330, a radio signal is generated which is transmitted by the antenna 358. As in the previous embodiment, when the limit switch 352 is engaged by, or disengaged from, the slide member 330 is configured to electrically connect the battery 362 to the controller 360, thereby supplying power to the sensor assembly 380. Similarly, after a predetermined period after engagement by, or disengagement from, the slide member 330, the limit switch 352 and controller 360 are configured to electrically disconnect the battery 362 from the controller, thereby turning off the power supply to the sensor assembly 380.

The sensor assembly 380 is thereby configured to send a signal which is indicative of the position of the slide member 330. As for the previous embodiment, the controller 360 has integrated functionality including, but not limited to, power management and communication control. The controller 360 is provided with a unique identifier such as a Media Access Control (MAC) address which is associated with, and therefore identifies, the particular indicator device. The data signal generated by the controller 360 and which is transmitted from the antenna 368 includes the MAC address of the controller, identifying the particular indicator device, and may contain additional information such as information relating to the remaining power supply level of the battery 362.

The controller 360 is configured to generate a data signal repeatedly for a predetermined period of time (typically five minutes) after actuation of the limit switch 352, after which the controller stops transmitting and enters a dormant mode, in order to preserve battery life.

In use, the indicating device of the third embodiment is typically mounted on a sliding door of a storage compartment as shown in WO 2013/068757 A1. The indicator device is configured so that as the sliding door to which it is fitted is moved to an extreme position, it engages a fixed member 370 on the storage compartment which displaces the trigger member 348 inwardly, disengaging the pawl or catch 340, thereby causing the slide member 330 be displaced into its lowermost position. In the lowermost position, the actuating member 353 of the limit switch 352 is engaged by the lowermost edge of the slide member 330, causing generation of an identifying signal, as described previously, which indicates that the storage compartment requires refilling.

When the storage compartment is refilled with stock, the slide member 330 is manually returned to its uppermost position, which is facilitated by the finger tab 332, in which position it re-engages the pawl or catch 340, thereby retaining it in its uppermost position. Movement of the slide member 330 away from its lowermost position disengages it from the limit switch 352. As described above, this generates a further signal for a predetermined period of time, which indicates that the storage compartment has been restocked.

As for the previous embodiment, the indicator device is also provided with a separate, second switch 354, which can be depressed manually. The switch 354 is positioned on the front face of the dispenser and is connected to the battery 362 and controller 360 and are configured such that when the switch 354 is depressed, power is supplied to the controller, which is configured to generate a second data signal which is transmitted via the antenna 358. The data includes information identifying the particular indicator device (and by extension dispensing device) along with further information indicating that the stock is required immediately.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For example, the system may be configured to allow bi-directional transmission of signals between the sensor assembly 180, 280, 380 and the central server 166. In a bi-directional wireless system, additional hardware such as a receiver may be included in the sensor assembly 180, 280, 380. Moreover, although the sensor assembly 180 has been described as being powered off when the indicating finger 102 is in the retracted position, the sensor assembly 180 may have continuous supply of power. Other aspects, features and advantages will be apparent upon an examination of the attached drawings and appended claims.

What is claimed is:

1. An indicator device comprising:
    an indicator member movable from a first position in which a portion of the indicator member is concealed to a second position in which the previously concealed portion of the indicator member is displayed, and movable manually from the second position to the first position;

means for releasably retaining the indicator member in the first position;

a switch means engageable by the indicator member when the indicator member is in the second position;

a signal generating means for generating a data signal, connected to the switch means;

a signal transmitting means connected to the signal generating means for wirelessly transmitting the data signal; and an electrical power source for supplying electrical power to the signal generating means and the signal transmitting means;

wherein the indicator device is configured to generate and transmit a first data signal on actuation of the switch means when the indicator member is moved manually from the first position to the second position and is configured to generate and transmit a second data signal upon actuation of the switch means when the indicator member is moved manually from the second position to the first position.

2. The indicator device as claimed in claim 1, wherein the device is configured to power down after a predetermined time following generation and transmission of the first and second data signals.

3. The indicator device as claimed in claim 1, wherein the indicator member is pivotally mounted.

4. The indicator device as claimed in claim 1, wherein the indicator member is slidably mounted.

5. A dispensing device comprising the indicator device as claimed in claim 1.

6. The indicator device as claimed in claim 1, wherein the visual indicator comprises a portion of the movable indicator member which is concealed from view when the indicator member is in the first position.

7. The indicator device as claimed in claim 1, wherein the indicator member is movable relative to the visual indicator.

8. The indicator device as claimed in claim 1, wherein the indicator member is movable manually between the first and second positions.

9. The indicator device of claim 1, wherein the indicator member is biased from the first position towards the second position.

10. The indicator device of claim 1, further comprising releasable catch means configured to releasably retain the indicator member in the first position.

11. The indicator device of claim 1, wherein the indicator member is movable relative to a visual indicator.

12. A dispensing device comprising:

a loading chamber;

a dispensing chamber loaded beneath the loading chamber;

a gate or shutter movable between a first, closed position and a second, open position to allow selective communication of the loading chamber and the dispensing chamber; and an indicator device comprising:

an indicator member movable between a first position in which a visual indicator is concealed and a second position in which the visual indicator is displayed;

a switch means engageable by the indicator member when the indicator member is in the second position; a signal generating means for generating a data signal, connected to the switch means;

a signal transmitting means connected to the signal generating means for wirelessly transmitting the data signal; and an electrical power source for supplying electrical power to the signal generating means and the signal transmitting means;

wherein the indicator device is configured to generate and transmit a first data signal on actuation of the switch means when the indicator member moves from the first position to the second position and generate and transmit a second data signal upon actuation of the switch means when the indicator member moves from the second position to the first position; and wherein the indicator member is retainable in its first position when the gate or shutter is in the closed position and is displaced to its second position when the gate or shutter is moved from the closed position to the open position.

13. The system comprising a dispensing device as claimed in claim 12, further comprising means for receiving the data signal and means for processing the data signal.

14. An indicator device comprising:

a visual indicator;

an indicator member movable with respect to the visual indicator from a first position in which it conceals the visual indicator to a second position in which the visual indicator is displayed, and movable manually from the second position to the first position, the indicator member being configured to remain in the first position or second position respectively unless moved manually from that position;

a switch means engageable by the indicator member when the indicator member is in the second position;

a signal generating means for generating a data signal, connected to the switch means;

a signal transmitting means connected to the signal generating means for wirelessly transmitting the data signal; and an electrical power source for supplying electrical power to the signal generating means and the signal transmitting means;

wherein the indicator device is configured to generate and transmit a first data signal on actuation of the switch means when the indicator member is moved manually from the first position to the second position and is configured to generate and transmit a second data signal upon actuation of the switch means when the indicator member is moved manually from the second position to the first position.

15. The indicator device as claimed in claim 14, wherein the device is configured to power down after a predetermined time following generation and transmission of the first and second data signals.

16. The indicator device as claimed in claim 14, wherein the indicator member is pivotally mounted.

17. The indicator device as claimed in claim 14, wherein the indicator member is slidably mounted.

18. A dispensing device comprising the indicator device as claimed in claim 1.

19. The indicator device as claimed in claim 14, wherein the indicator member is movable manually between the first and second positions.

20. The indicator device of claim 14, wherein the indicator member is biased from the first position towards the second position.

21. The indicator device of claim 14, comprising means for releasably retaining the indicator member in the first position.

22. The indicator device of claim 14, comprising releasable catch means configured to releasably retain the indicator member in the first position.

* * * * *